Jan. 19, 1965        R. T. BUTLER        3,166,140
POWERED GARDEN TILLAGE IMPLEMENT
Filed Sept. 16, 1963        3 Sheets-Sheet 1

INVENTOR.
Ralph T. Butler
BY
Hovey, Schmidt, Johnson & Hovey
ATTORNEYS.

Jan. 19, 1965 R. T. BUTLER 3,166,140
POWERED GARDEN TILLAGE IMPLEMENT
Filed Sept. 16, 1963 3 Sheets-Sheet 2

INVENTOR.
Ralph T. Butler
BY
Hovey, Schmidt, Johnson & Hovey.
ATTORNEYS.

Jan. 19, 1965     R. T. BUTLER     3,166,140
POWERED GARDEN TILLAGE IMPLEMENT
Filed Sept. 16, 1963     3 Sheets-Sheet 3
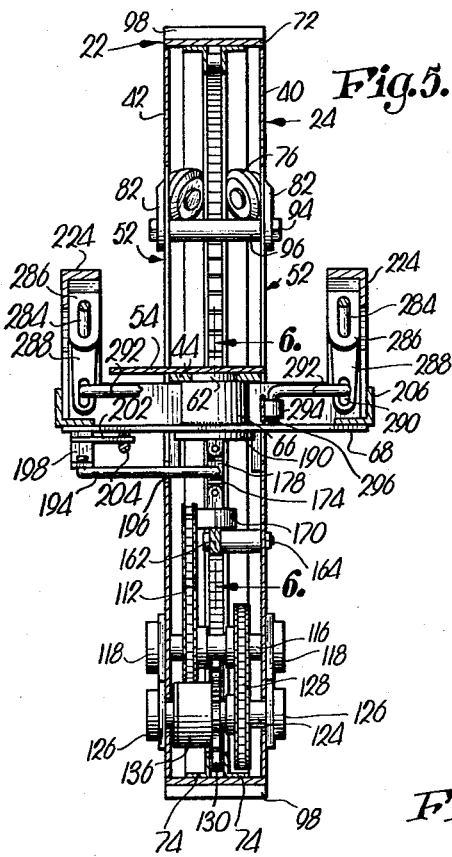
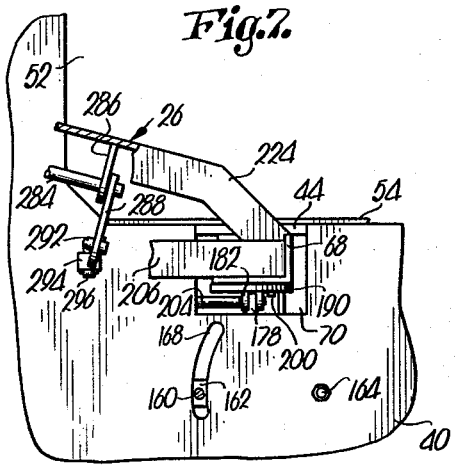
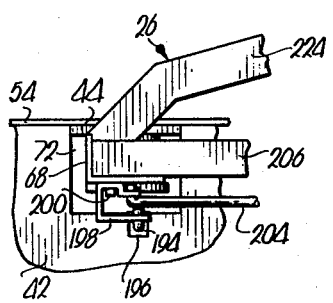
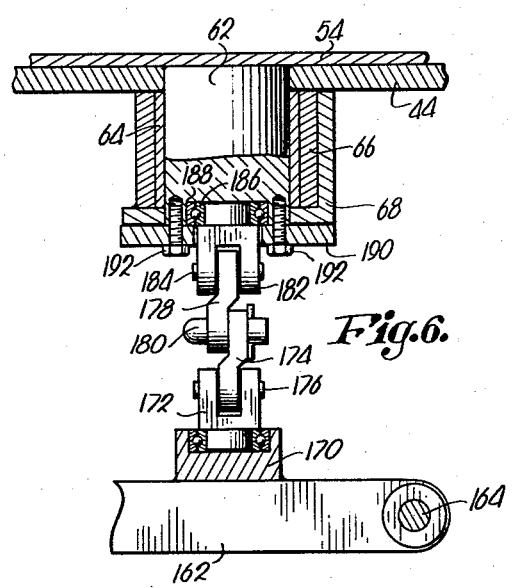
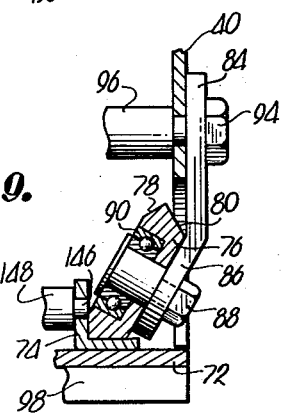
INVENTOR.
Ralph T. Butler
BY
ATTORNEYS.

United States Patent Office 3,166,140
Patented Jan. 19, 1965

3,166,140
POWERED GARDEN TILLAGE IMPLEMENT
Ralph T. Butler, 945 E. University, Springfield, Mo.
Filed Sept. 16, 1963, Ser. No. 309,262
9 Claims. (Cl. 180—19)

This invention relates to a power driven, soil tillage implement, and more particularly, to such an implement of improved construction for use in gardens of small or generally limited areas.

It is the primary object of the present invention to provide a power driven, essentially one-wheel tractor suitable for use in garden tillage and which is simple to operate, economical to produce and maintain, and capable of being utilized for readily drawing any one of a number of different kinds of soil tillage tools over the ground.

Another object of the present invention is the provision of an implement of the type described which is constructed to permit easy steering thereof in different directions over the ground without the operator having to pit his strength against the power of the implement itself, whereby the implement may be more easily controlled than a conventional two-wheel tractor and especially while the implement is being turned.

Another object of the present invention is the provision of a one-wheel tractor which is provided with power means carried by the wheel itself, and furthermore, is provided with controls coupled with the power means and conveniently located rearwardly of the wheel for actuation by the operator whereby the implement forms a self-contained unit which may be readily controlled manually and guided by the operator walking behind the same.

Still another object of the present invention is the provision of an implement of the type described which is constructed with the power source therefor in direct alignment with the force resisting forward movement of the implement, i.e., the resistance resulting from the tillage tool of the implement engaging the ground, so that the power is more effectively utilized since the tendency for the machine to move to one side or the other of the line of draft, as has been the case in two-wheel tractors where the traction of opposed wheels against the ground varies, is eliminated and, as a result, the work of tilling the soil may therefore be more effectively and easily performed by the implement of the present invention.

Yet another object of the present invention is the provision of a one-wheel tractor having a rotatable, ground-engaging rim or wheel surrounding and supporting a frame carrying the engine therefor permitting not only a very efficient and inexpensive drive connection from the engine to the rim but also allowing for pivoting of the rim about a vertical axis so that the machine may be steered while in an upright position.

Still another object of the present invention is the provision of a power source for an implement of the type described wherein the source utilizes an improved belt tightener in a manner such that the coupling of the engine to the rim may be controlled from the operator's position remote from the engine and also permits the tension of the belt to be maintained constant as the wheel is turned to steer the implement.

A further object of the present invention is the provision of height adjustment means on the implement of the above mentioned character so that tillage tools of various kinds may be accommodated on the implement and the latter may be adjusted for travel through the ground at any selected depth.

Still another object of the present invention is the provision of steering means for an implement of the type described which permits maneuverability of the implement without excessive leaning or canting of the wheel with respect to the ground so that steering of the implement may be easily effected by the operator while the depth of penetration of the tool on the implement through the transverse width thereof is maintained uniform even during the time that the wheel is being turned.

In the drawings:

FIG. 5 is a cross-sectional view taken along line 5—5 of FIG. 3;

FIG. 6 is a cross-sectional view taken along line 6—6 of FIG. 5;

FIG. 7 is an enlarged, fragmentary, elevational view of the center section of one side of the frame and illustrating structure for steering the wheel and frame over the ground;

FIG. 8 is a view similar to FIG. 7 but looking at the opposite side of the frame and illustrating the crank means for actuating the clutch of the prime mover;

FIG. 9 is a cross-sectional view taken along line 9—9 of FIG. 3;

The present invention provides a one-wheel tractor having a soil tillage tool releasably coupled therewith for movement over the ground under the influence of the rotation of the wheel which is powered by an engine mounted on a frame within the wheel and operably coupled to the latter. Means is provided for selectively changing the direction of forward movement of the wheel so that the implement may be easily steered without leaning of the unit to one side or the other. To facilitate steering of the wheel, the engine carrying frame located within the wheel has a member pivotally receiving an element secured to the wheel mounting structure so that upon manual operation of control mechanism on the handles of the machine and which are operably connected to the wheel bearing structure, the wheel may be easily turned from side to side as desired.

Structure is also provided for adjusting the height of the steering structure with respect to the ground so that the operating depth of a tool on the implemement may be altered as selected by the operator.

Figure 1:
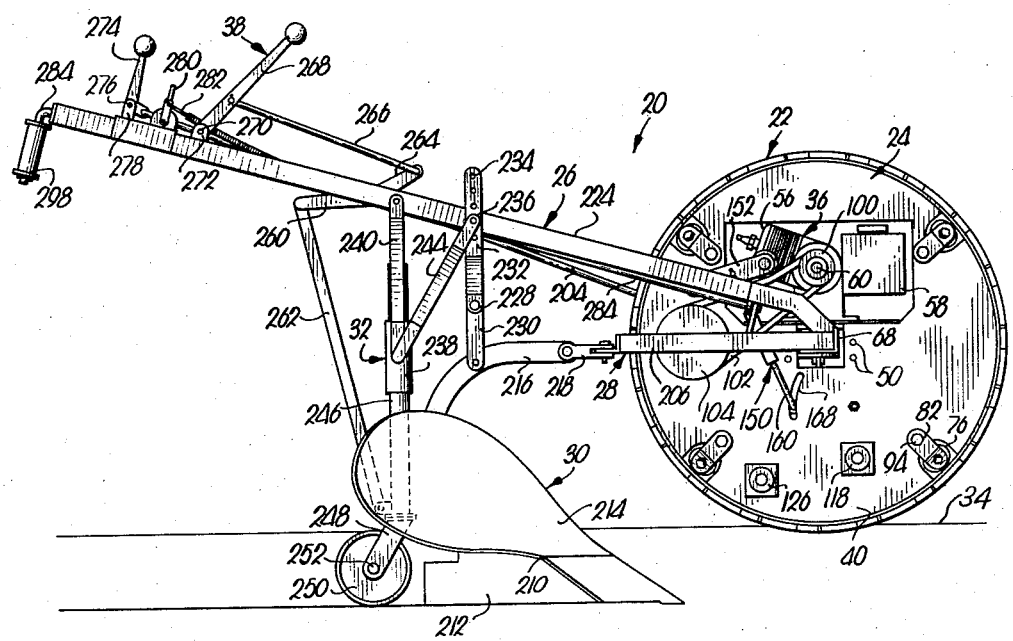
FIGURE 1 is a side elevational view of the implement of the instant invention and illustrating the use of a plow therewith.

The implement of the instant invention is broadly denoted by the numeral 20 and includes a single wheel 22 mounted for rotation and in supporting relationship to a frame 24 disposed within wheel 22 and provided with guide structure 26 which extends normally rearwardly of wheel 22 and frame 24 as is shown in FIG. 1. A drawbar 28 also extends rearwardly of wheel 22 and frame 24 for coupling a suitable soil tillage tool 30 to frame 24. Height adjustment means 32 is pivotally coupled with structure 26 to regulate the height of the latter above the level 34 of the ground so that tool 30 may be moved under the influence of the rotation of wheel 22 either in or out of an operative position in engagement with the ground.

A power source 36 carried by frame 24 and operably coupled with wheel 22, causes the latter to be rotated in a forward direction of movement so as to draw tool 30 along the ground and to perform certain desired functions, depending upon the condition of the soil.

Control means 38 carried at the rearmost end of structure 26 and actuated by an operator walking behind wheel 22, permits the operator to control the speed of movement of wheel 22, to effect the interconnection of source 36 with wheel 22, to steer wheel 22 in a number of different directions relative to a reference line of draft, and to adjust the height of structure 26 above level 34 to in turn raise and lower tool 30 with respect to the ground.

Frame 24 includes a pair of side plates 40 and 42 which are normally held in spaced-apart relationship by a connector plate 44 which is normally horizontal and provided with a pair of spaced, depending legs 46 on each of the side edges thereof adjacent the inner surface of the corresponding one of the side plates 40 and 42. Legs 46 are each provided with a pair of threaded bores 48 which receive bolts 50 so as to secure the corresponding side plate to plate 44.

Figure 3:
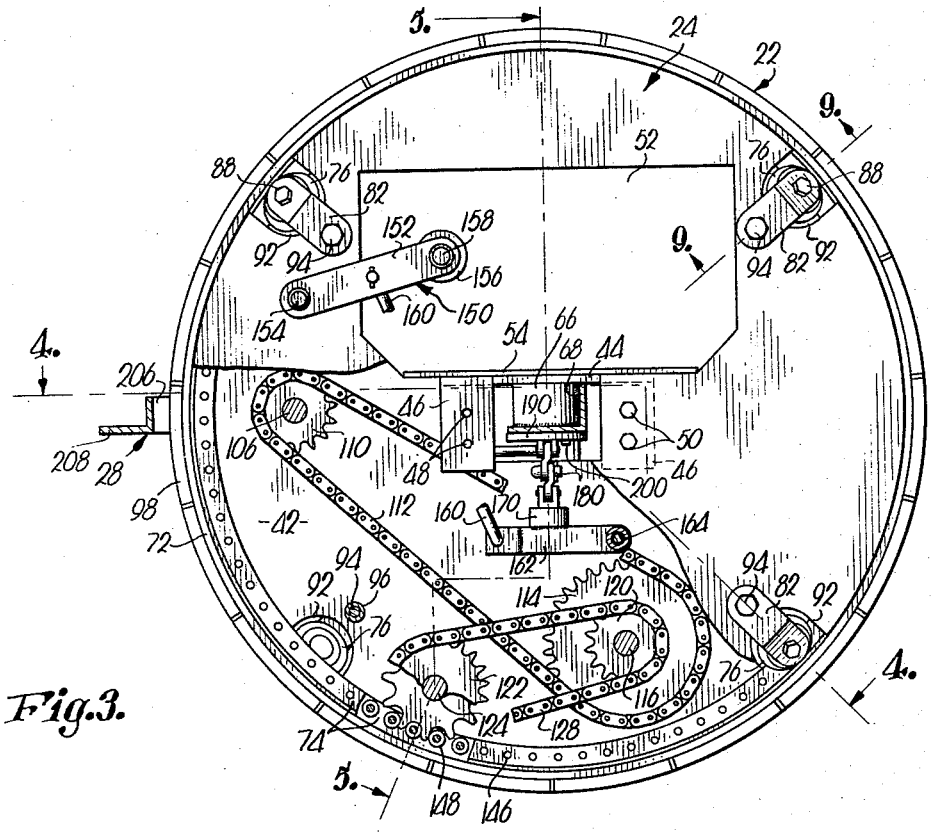
FIG. 3 is an enlarged, fragmentary, side elevational view of the frame and wheel of the implement with the prime mover forming the power source of the implement removed from the frame, parts being in section to illustrate details of construction.

Each of the plates 40 and 42 is provided with an opening 52 adjacent the normally upper extremity thereof as is clear in FIG. 3, openings 52 being aligned and receiving a normally horizontal platform 54 rigid to plate 44 as shown in FIG. 6.

Source 36 is in the nature of a 2-cycle gasoline engine 56 having a fuel tank 58 coupled therewith in spaced relationship to the output or drive shaft 60 thereof. Engine 56 is rigidly secured to platform 54 with openings 52 so as to be suitably contained within wheel 22 as shown in FIG. 1.

As illustrated in FIG. 6, an axle 62 is telescopically received within a bearing 64 which in turn is received within a sleeve 66 rigid to a transversely L-shaped member 68 forming a part of frame 24.

Figure 2:
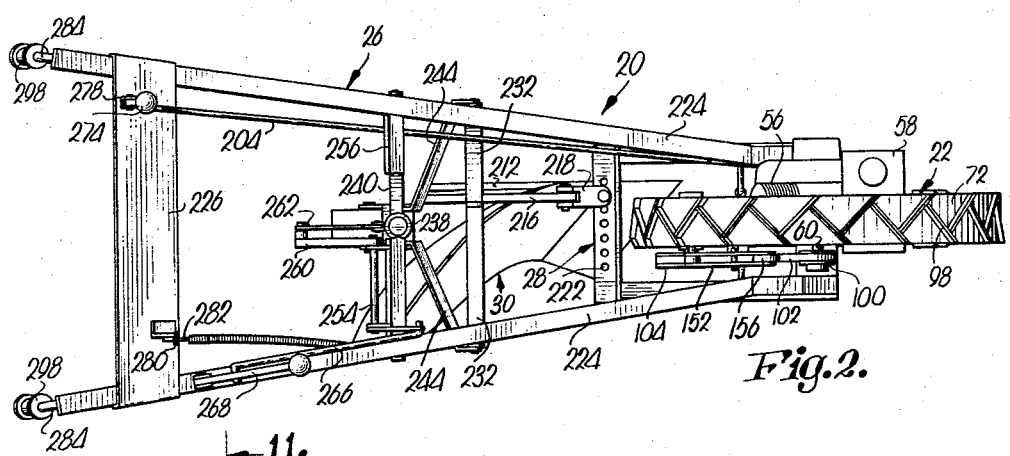
FIG. 2 is a top plan view of the implement.

Each of the plates 40 and 42 is provided with a generally rectangular opening 70 which opens up into the corresponding opening 52 and is located below the latter. Member 68 is disposed within openings 70, the latter being aligned, and projects outwardly from side plates 40 and 42 as shown in FIG. 2. By virtue of the construction shown in FIG. 6, axle 62, and thereby plates 40 and 42, are rotatable about the axis of hub of axle 62 with respect to sleeve 66 and member 68. Side plates 40 and 42 and member 68 are, therefore, relatively pivotal portions of frame 24 to effect the steering of implement 20 in a manner hereinafter described.

Wheel 22 is provided with a circular rim 72 having a pair of spaced angle iron elements 74 rigid thereto on the inner surface thereof as shown in FIGS. 5 and 9. Each of the plates 40 and 42 is provided with a number of rollers 76 at circumferentially spaced locations thereon as shown in FIGS. 1 and 3, which rollers 76 bear against the corresponding element 74 in the manner shown in FIG. 9. To this end, each roller 76 is provided with a pair of generally perpendicular surfaces 78 and 80 which complementally engage the corresponding faces of the respective elements 74, as shown in FIG. 9. To this end, each roller 76 is rotatable about an axis inclined with respect to the horizontal and is mounted on a bracket 82 having a first leg 84 rigid to the corresponding side plate 40 or 42, and a second leg 86 which mounts roller 76 thereon by means of a bolt 88. A bearing 90 permits roller 76 to rotate on bolt 88 with a minimum amount of friction.

Each of the plates 40 and 42 is provided with a notch or slot 92 at each of the locations at which a roller is disposed so that the plane of rotation of each of the various rollers will be within the plane of the corresponding side plate.

Rollers 76 of side plates 40 and 42 are generally aligned so that corresponding brackets 82 may be coupled together by a single bolt 94 which also serves to interconnect plates 40 and 42 and strengthens frame 24 as a result. A spacer 96 on each bolt 94 maintains side plates 40 and 42 a uniform distance apart.

By the use of rollers 76 coupled with plates 40 and 42 in the manner described, rim 72 is mounted on frame 24 for rotation is opposed directions about the central axis of rim 72. A series of cleats 98 are rigid to and project outwardly from the outer periphery of rim 72 to provide traction for wheel 22 when the latter engages the ground.

Drive shaft 60 of engine 56 is provided with a sheave 100 over which a flexible, endless belt 102 is trained. Belt 102 is also trained over a sheave 104 carried on a shaft 106 spanning the distance between side plates 40 and 42 at a location spaced from openings 52 and 70, as is clear in FIGS. 1 and 4. Bearings 108 journal shaft 106 on side plates 40 and 42.

A sprocket 110 is rigid to shaft 106 between plates 40 and 42 and is coupled with an endless, flexible chain 112 which is in turn trained over a sprocket 114 having a diameter larger than the diameter of sprocket 110. Sprocket 114 is carried by a shaft 116 and between side plates 40 and 42, bearings 118 being provided for journaling shaft 116 on plates 40 and 42.

A sprocket 120 having a diameter small than sprocket 114, is rigid to shaft 116 and spaced from a sprocket 122 rigid to a shaft 124 journaled in side plates 40 and 42 by bearings 126. An endless, flexible chain 128 is trained over sprockets 120 and 122 as shown in FIG. 3. By virtue of sheave 104 and sprockets 110, 114, 120 and 122, the speed of rotation of shaft 124 is less than the speed of rotation of shaft 60.

Figures 10, 11:
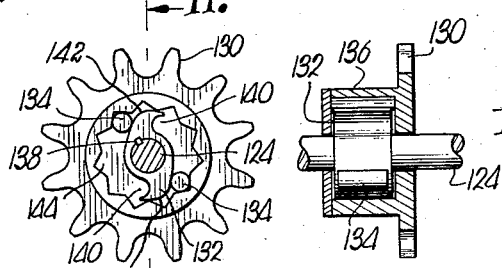
FIG. 10 is an enlarged, side elevational view of the pinion interconnecting the rim or wheel of the implement with the power source and illustrating ratchet mechanism for releasably coupling the pinion to a drive shaft.
FIG. 11 is a cross-sectional view taken along line 11—11 of FIG. 10.

A pinion 130, illustrated in FIGS. 10 and 11, is coupled to shaft 124 by means of a ratchet 132 and a pair of pins 134 floatingly held within a housing 136 carried by pinion 130 and provided with a circular inner periphery having serrations defining a plurality of notches 144 as is clear in FIGS. 10 and 11. Ratchet 132 is carried by shaft 124 within housing 136 as shown in FIG. 11. Ratchet 132 is rigidly coupled with shaft 124 by a key 138 and provided with hook-like recesses 140 for receiving pins 134 when ratchet 132 rotates in a clockwise sense when viewing FIG. 10. Ratchet 132 is also provided with a pair of generally diametrically opposed surfaces 142 which engage corresponding pins 134 and force the latter into proximal notches 144 on the inner periphery 136 of pinion 130 when ratchet 132 rotates in a counterclockwise sense, when viewing FIG. 10.

When the ratchet 132 rotates in a counterclockwise sense under the influence of the rotation of shaft 124, surfaces 142 engage pins 134 to force the latter into the proximal notches 144 and thus interconnect pinion 130 with shaft 124. Pinion 130, therefore, rotates in the same direction as shaft 124, the latter in turn being rotated under the influence of drive shaft 60.

When pinion 130 rotates in a clockwise sense when viewing FIG. 10, pins 134 are moved therewith out of engagement with surfaces 142, provided, of course, that shaft 124 is not rotating. When this occurs, pinion 130 is disconnected from shaft 124 and will remain so until ratchet 132 is again rotated by shaft 124.

A number of spaced, generally parallel pins 146 are secured in any suitable manner to and span the distance between elements 74 in spaced relationship to the inner surface of rim 72. A sleeve or roller 148 is rotatably mounted on each pin 146, respectively, and adjacent rollers 148 define a space for receiving a tooth of pinion 130 in the manner shown in FIG. 3. Rollers 148 are, therefore, disposed on the inner periphery of wheel 22 and form essentially a ring gear in mesh with pinion 130. It is evident that, when shaft 60 of engine 56 rotates, and when pins 134 are positioned as shown in FIG. 10, pinion 130 will be rotated in a counterclockwise sense to in turn rotate rim 72 in a clockwise sense when viewing FIG. 3. Wheel 22 will then be moved forwardly over the ground to draw tool 30 therewith.

Belt tightener mechanism 150 is coupled with belt 102 for alternately applying tension to and removing tension from belt 102 to thereby provide a clutch arrangement between sheaves 100 and 104. To this end, an arm 152 is pivotally coupled at one end thereof to plate 40 adjacent the outer face thereof by means of a pin 154 for rotation about an axis parallel to shaft 60. A sheave 156 is journaled on the opposite end of arm 152 by a pin 158 and is movable into and out of engagement with belt 102 to alternately apply tension to and remove tension from the same. When tension is applied to belt 102 by sheave 156, sheave 104 is driven by sheave 100 through belt 102. When tension is removed from belt 102 there is no driving connection between sheaves 100 and 104.

A rod 160 is pivotally coupled adjacent one end thereof to arm 152 intermediate the ends of the latter. The opposite end of rod 160 is coupled with a Z-shaped bar 162 at one extremity of the latter. The opposite extremity of bar 162 is pivotally coupled by means of a pin 164 to plate 40 within the space between plates 40 and 42. It is noted that rod 160 is provided with a lateral projection 166 at the lower end thereof which extends through an arcuate slot 168 in plate 40 before projection 166 is pivotally coupled with bar 162.

Bar 162 is provided with a bearing mount 170 which, in turn, is provided with a bearing coupled to a clevis 172. A link 174 is pivoted to clevis 172 by a pin 176 and to another link 178 by a pin 180. Link 178 is pivoted to a clevis 182 by a pin 184, clevis 182 being coupled with a bearing 186 received within a recess 188 in the lower surface of axle 62. A plate 190 is secured by bolts 192 to the underside of axle 62 to retain bearing 186 in place. Both axles 62 and bar 162 are rotatable with respect to links 174 and 178.

Figure 4:
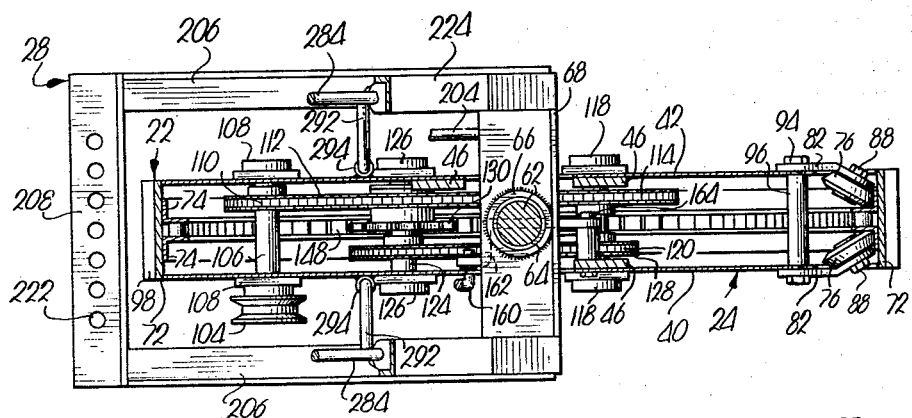
FIG. 4 is a cross-sectional view taken along line 4—4 of FIG. 3.

Pin 180 is integral with a rod 194 extending laterally from links 174 and 178 and through an opening 196 in plate 42 as is clear in FIG. 5. The opposite end of rod 194 is pivoted to a generally C-shaped bracket 198 pivoted by means of a pin 200 to the underside of member 68. A strip 202 extends laterally from bracket 198 and toward plate 42, but terminates in spaced relationship to the latter. A rod 204 is rigid to the inner end of strip 202 and extends rearwardly of wheel 22, as shown in FIG. 4. Rod 204 is coupled with structure 26 in a manner hereinafter described.

Drawbar 28 includes a pair of spaced, generally parallel arms 206 of angle iron stock, rigidly secured to the outer ends of member 68 and extending in a direction rearwardly of wheel 22 as shown in FIG. 1. The rearmost ends of arms 206 terminate rearwardly of rim 72 and are interconnected by a perforated crosspiece 208 also of angle iron stock.

Tool 30, for purposes of illustration only, comprises a plow 210 having a generally upright plate section 212, and a share and moldboard section 214 rigid to section 212. An L-shaped connecting member 216 is rigid to plate section 212 and is releasably coupled by means of a coupling member 218 to crosspiece 208 of drawbar 28. A pin 220 passes through member 218 and through any one of a number of the perforations 222 in crosspiece 208 to secure tool 30 to drawbar 28.

Although a tool 30 in the nature of a plow, has been illustrated, it is to be made clear that any tool for tilling the soil may be coupled to drawbar 28 and drawn over the ground by the rotation of wheel 22.

Guide structure 26 includes a pair of beams 224 of angle iron stock secured at proximal ends thereof to the outer extremities of member 68, as shown in FIGS. 1 and 2. Beams 224 extend upwardly and rearwardly of the interconnection thereof with member 68 and, as shown in FIG. 2, the major portions of beams 224 are relatively divergent as the outermost ends thereof are approached. A strip 226 of rigid material, interconnects beams 224 adjacent the outermost ends thereof, and a Y-shaped support member 228 releasably and adjustably interconnects member 216 with beams 224. To this end, member 228 is provided with a lower leg 230 pivotally coupled to member 216, and a pair of generally divergent arms 232 having spaced holes 234 along the lengths thereof for receiving pins 236 which interconnect arms 232 with the proximal beams 224. The distance between beams 224 and member 216 is thus controlled by the setting of arms 232 on beams 224.

Adjusting means 32 includes a sleeve 238 having a pair of arms 240 secured to and extending upwardly therefrom toward proximal beams 224. Arms 240 are relatively divergent and are pivotally coupled to proximal beams 224 by pins 242 to mount sleeve 238 below the same. A pair of arms 244 are secured at the lower ends thereof to sleeve 238 and extend forwardly and upwardly of the latter and connect with beams 224 by means of pins 236. Arms 244 work in conjunction with arms 240 to maintain sleeve 238 in a vertically disposed position.

A stem 246 is telescopically received within sleeve 238 and extends downwardly therefrom. Stem 246 is provided with a bifurcated lower end 248 and rotatably receives a ground-engaging wheel 250 coupled therewith by means of a pin 252.

A shaft 254 is carried by a crosspiece 256 secured to and spanning the distance between beams 224. A pair of brackets 258 rigid to crosspiece 256, journals shaft 254 for rotation about the axis of the latter. A first crank arm 260 is rigid to and extends generally downwardly and rearwardly of one end of shaft 254. A link 262 is pivotally connected to the outer end of arm 260 and adjacent the lower end of stem 246 as shown in FIG. 1.

A second crank arm 264 is rigid to and extends upwardly and generally forwardly of the opposite end of shaft 254 and is pivotally coupled with a rod 266 which extends rearwardly of arm 264 and pivotally coupled at the rear end thereof with a control stick 268 pivotally mounted on the proximal beam 224 by a pin 270 and ears 272. Movement of arm 268 rearwardly of wheel 22 causes stem 246 to be lowered with respect to sleeve 238 to in turn lower wheel 250 with respect to beams 224. Movement of control sticks 268 in the opposite direction causes wheel 250 to be raised with respect to beams 224.

Rod 204 extends rearwardly of wheel 22 and terminates adjacent and above strip 226. The rearmost end of rod 204 is coupled to an L-shaped control stick 274, the latter in turn being pivotally coupled on strip 226 by means of a pin 276 spaced above the upper surface of strip 226 by ears 278. By rotating stick 274 in a counterclockwise sense, when viewing FIG. 1, rod 204 is pulled rearwardly to cause bracket 198 to rotate in a direction to shift rod 194 to the left when viewing FIG. 5. This, in turn, causes bar 162 to be pivoted in a clockwise sense when viewing FIG. 3 to, in turn elevate sheave 156 out of engagement with belt 102. Movement of control stick 274 forwardly with respect to wheel 22 causes rod 204 also to be moved forwardly to rotate bracket 198 in the opposite direction and force rod 194 to the right when viewing FIG. 5. This, in turn, causes, both bar 162 and sheave 156 to swing downwardly to in turn cause tension to be applied to belt 102.

A throttle control lever 280 is carried on strip 226 adjacent one end thereof as shown in FIG. 2 and is coupled by means of a flexible cable 282 to the throttle control on engine 56.

A pair of rods 284 are carried by beams 224 for rotation about the longitudinal axes of rods 284. As shown in FIG. 7, the forwardmost ends of each rod 284 is supported by an ear 286 rigid to and depending from the proximal beam 224. A crank arm 288 is rigid to the forwardmost end of the proximal rod 284 and is provided with a slot 290 in the lower end thereof as shown in FIG. 5.

A rod 292 having a projection extending through slot 290, extends laterally of arm 288 toward the proximal side plate 40 or 42. An eyelet 294 is rigid to the corresponding side plate 40 or 42 and pivotally receives the normally downwardly projecting, proximal end 296 of rod 292. A handle 298 is rigid to the outer ends of each of rods 284 respectively. Rotation of rods 284 by an operator grasping handle 298, is sufficient to cause side plates 40 and 42 to be shifted together in the corresponding direction relative to member 68. Since rim 72 is carried by side plates 40 and 42, the direction of forward movement of rim 72 will be altered when side plates 40 and 42 are shifted relative to member 68. In this way, the steering of wheel 22 is effected and the operator of implement 20 does not need to "fight" the implement or pit his strength against the power applied to rim 72 and generated by engine 56.

In operation, tool 30 is coupled to drawbar 28 and, as mentioned above, tool 30 may be any one of a number of different kinds of soil tillage devices. The height of wheel 250 may be adjusted by manipulating control stick 268 so that wheel 250 will move along the ground and track with wheel 22 without requiring that the operator of implement support the rear ends of beam 224.

Upon actuation of engine 56, power is delivered to rim 72 by shifting control stick 274 forwardly to in turn cause sheave 156 to engage belt 102 and apply tension to the latter. This, in turn, causes pinion 130 to rotate in a counterclockwise sense when viewing FIG. 3, since ratchet 132 will immediately move counterclockwise with shaft 124 and surfaces 142 of ratchet 132 will force pins 134 into notches 144 to interlock shaft 124 and pinion 130.

Upon rotation of pinion 130, rim 72 will be driven in a forward direction over the ground and, by virtue of cleats 98, the implement 20 will be driven with rim 72. The speed of implement 20 will be controlled by lever 280 and this can be adjusted by the operator of implement 20 during operation of the latter.

It is to be noted that sheave 156 is maintained in engagement with belt 102 by virtue of the fact that the longitudinal axis of rod 204 passes to one side of pivot 276 coupling control stick 274 to ears 278. Control stick 274 is thus effectively and releasably locked in place until it is manually pulled rearwardly.

To effect turning movements of wheel 22 the operator rotates rods 284 by twisting handles 298 in the same direction. For instance, if it is desired to turn wheel 22 to the right, the operator will rotate rods 284 in a clockwise sense so that, as shown in FIG. 5, rods 292 will shift plates 40 and 42 to the left. Since eyelets 294 are rearwardly of axle 62, the forwardmost portion of wheel 22 will turn to the right and rim 72 will move in the corresponding direction. Conversely, rotation of rods 284 in a counterclockwise sense will cause wheel 22 to turn to the left.

It is noted that when side plates 40 and 42 pivot relative to member 68, axle 62 rotates with pleats 40 and 42 and relative to links 174 and 178. Hence, bearing 186 is required to permit this movement. Similarly, since bar 162 is coupled to side plates 40 and 42, it also will shift therewith and will shift relative to links 174 and 178. Thus, it is evident that the bearing of mount 170 is required.

Implement 20 may be readily moved over the ground to and from a point of use by manipulating control stick 268 so as to lower and raise wheel 250. By lowering wheel 250, tool 30 is raised relative to the ground and implement 20 may then be readily moved from place-to-place for subsequent use. Likewise, tool 30 may be lifted with respect to the ground when making turns, for instance, at the end of a crop row to in turn facilitate the handling of implement 20 preparatory to making another pass over the ground.

As mentioned above, the making of turns is effected by rotating rods 284 upon twisting of handles 298. When the operator desires to pull implement 20 rearwardly, sleeve 156 is moved out of engagement with belt 102 by shifting control stick 274 rearwardly, at which time shaft 124 ceases to rotate. A slight rearward movement of rim 72 causes pinion 130 to rotate in a counterclockwise sense when viewing FIGS. 3 and 10 so that pins 134 are received within recesses 140 of ratchet 132. Therefore, the initial effects of sprockets 110, 114, 120 and 122 are eliminated when moving implement 20 rearwardly. The operator need, therefore, to expend only a minimum of energy to move implement 20 rearwardly.

The present invention provides a self-contained one-wheel tractor having the prime mover or power source mounted on the ground-engaging wheel thereof so as to take up a minimum of space, while at the same time, positioning the power source for easy access and maintenance. The present invention also provides structure for permitting a rapid interchange of tillage tools without requiring the necessity for special tools or without requiring special skills on the part of the operator of implement 20. The position of wheel 22 with respect to tool 30 is such as to utilize the maximum power generated by source 36 since tool 30 is generally in alignment with the path of travel over the ground of wheel 22.

The steering characteristics of implement 20 render the same especially suitable for use in gardens of small or generally limited areas, since the operator need not "fight" the implement 20 in order to maintain control of the same. The steering structure of the present invention permits implement 20 to be highly maneuverable so that a given job may be performed in a minimum of time and with a minimum expenditure of energy on the part of the operator of implement 20.

It is clear that the present invention is not limited to the use of soil tillage tools. For instance, a mowing attachment could be coupled to implement 20 either at the front end or rear end thereof for the mowing of grass, weeds and the like. Also, a blade could be coupled to the front or rear end of implement 20 for snow removal purposes or for moving grain from place-to-place.

Having thus described the invention, what is claimed as new and desired to be secured by Letters Patent is:

1. A tractor unit adapted to be coupled to a work attachment comprising:
   a frame having an outer periphery;
   a ground-engaging wheel rotatably mounted in an upright position on the outer periphery of said frame for rotation relative thereto about the axis of the wheel;
   drive means carried by the frame and operably coupled with said wheel for rotating the latter;
   a mounting member extending laterally from the frame beyond the latter;
   elongated guide structure alongside the wheel connected to said member and extending rearwardly therefrom;
   mounting means within the perimeter of said wheel and rotatably securing said frame to the member for pivotal movement of the frame relative to the member and guide structure about a vertical axis in intersecting relationship to said wheel axis;
   control means carried by said guide structure and coupled with said frame for pivoting the latter and thereby said wheel relative to said guide structure about said vertical axis; and
   drawbar means for coupling a work attachment to said mounting member.

2. A tractor unit as set forth in claim 1, wherein said control means includes a rod carried by said guide structure and extending longitudinally thereof, said rod being rotatable about its longitudinal axis, and a link pivotally interconnecting said rod with said frame at a location on the latter in spaced relationship to said mounting means, whereby said frame is pivoted relative to said guide structure and the mounting member as said rod is rotated about its axis.

3. A tractor unit as set forth in claim 1, wherein said mounting means includes a normally vertically disposed axle and bearing means on the member mounting the latter on said axle for pivotal movement about the axis thereof.

4. A tractor unit as set forth in claim 3, wherein said axle is rigid to said frame, is disposed with its longitudinal axis substantially perpendicular to said wheel axis and said bearing means includes a sleeve rigid to said member, said axle being disposed within and rotatable with respect to said sleeve.

5. A tractor unit as set forth in claim 1, wherein said drive means includes a power source secured to said frame in generally overlying relationship to said mounting means.

6. A tractor unit as set forth in claim 1, wherein said frame includes a pair of spaced interconnected side plates, said mounting means being disposed between said plates.

7. A tractor unit as set forth in claim 1, wherein said drive means includes a clutch arm mounted on said frame for movement with respect thereto into and out of an operative position, and linkage structure shiftably carried by said guide structure, pivotally connected to said clutch arm for moving the latter into and out of said position as said linkage structure is shifted in opposed directions relative to said guide structure and as the frame rotates relative to the linkage structure, said linkage structure being operable to maintain said clutch arm in said position as said frame pivots relative to said member and the guide structure.

8. A tractor unit as set forth in claim 7, wherein said linkage structure includes a reciprocable rod and pivot means coupling said rod to said clutch arm to permit rotation of the frame and said clutch arm relative to said rod without movement of the latter, said rod being movable independently of the frame to shift said clutch arm to and from said position thereof.

9. A tractor unit as set forth in claim 8, wherein said pivot means includes a pair of links adjacent said mounting means, interconnected at proximal ends thereof and lying on said vertical axis of pivoting of the frame when in aligned relationship to present a toggle, said rod being pivotally coupled at one end thereof to said links to shift the latter relatively and thereby open and close the toggle in response to reciprocation of the rod, and wherein is included bearing means coupling one of the links to the mounting means while permitting free rotation therebetween, connector means operably joined to said clutch arm for swinging the latter to and from said position thereof as the connector means is moved, and bearing means joining the other link to said connector means while permitting free relative rotation therebetween whereby the clutch arm may be shifted to and from said position by reciprocation of the rod independently of swinging of the frame relative to the mounting member.

References Cited by the Examiner
UNITED STATES PATENTS

| | | | |
|---|---|---|---|
| 1,075,061 | 10/13 | Parker | 180—19 |
| 1,322,028 | 11/19 | Lehman et al. | 180—19 |
| 1,370,538 | 3/21 | Hogg | 180—19 |
| 1,428,231 | 9/22 | Hicks | 180—19 |
| 1,443,951 | 2/23 | George | 180—19 |
| 1,612,823 | 1/27 | Keese | 180—19 |
| 1,686,983 | 10/28 | Parker | 180—19 |
| 2,408,937 | 10/46 | Lendermon | 180—19 |
| 2,549,182 | 4/51 | Ekenstam | 180—10 X |
| 2,725,705 | 12/55 | Anderson | 180—19 X |

A. HARRY LEVY, *Primary Examiner.*
RUSSELL R. KINSEY, *Examiner.*